J. ANDREWS.
Churn.
No. 7,298.
Patented April 23, 1850.
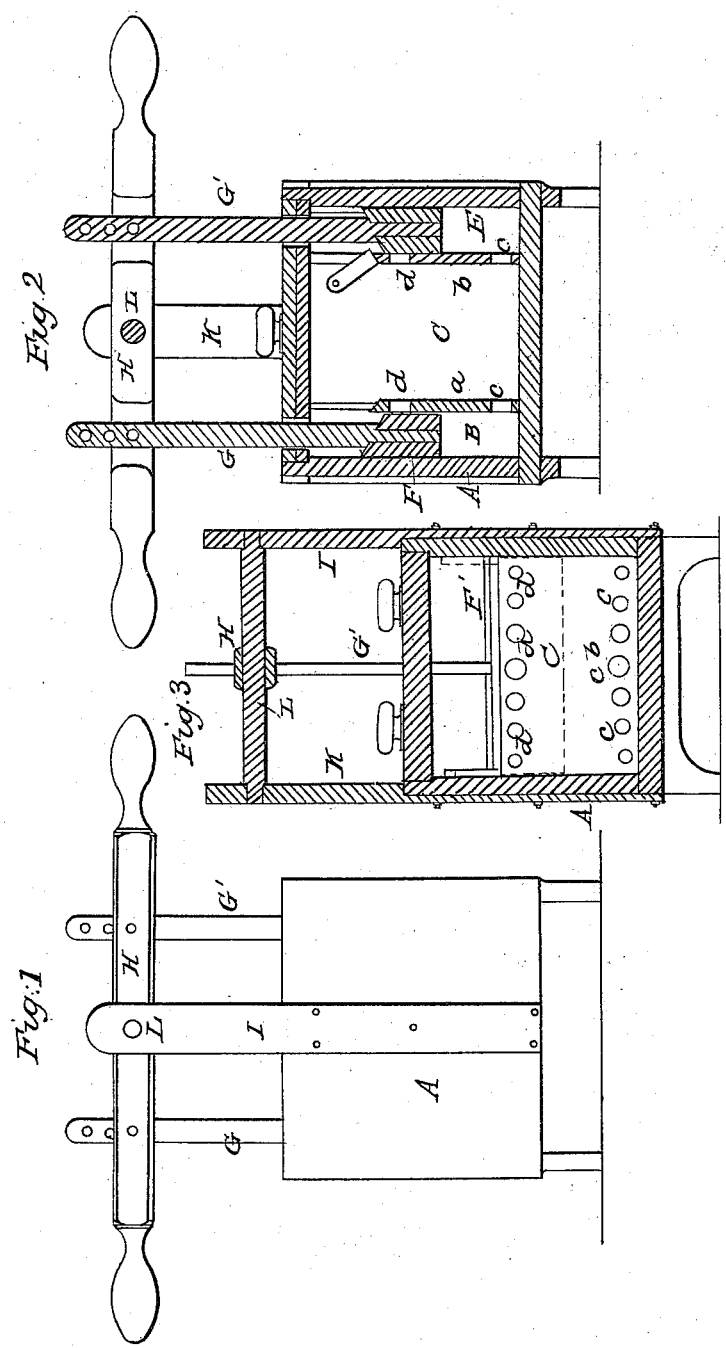

UNITED STATES PATENT OFFICE.

JOHN ANDREWS, OF MIDDLESEX COUNTY, MASSACHUSETTS.

CHURN.

Specification of Letters Patent No. 7,298, dated April 23, 1850.

*To all whom it may concern:*

Be it known that I, JOHN ANDREWS, of the county of Middlesex and State of Massachusetts, have invented a new and useful or Improved Churn for Making Butter; and I do hereby declare that the same is fully described and represented in the following specification and accompanying drawings, letters, figures, and references thereof.

Of the said drawings, Figure 1 denotes a side elevation of my improved churn. Fig. 2 is a vertical central and longitudinal section of it. Fig. 3 is a vertical central and transverse section of it.

In the said drawings A denotes the box or reservoir of the churn the said box being divided by means of two vertical partitions $a, b$, into three apartments B, C, E. Through each partition and at or near its bottom a series of holes $c, c, c$, &c., is made, which holes lead open communication from the middle chamber C, into each of the others. These holes are to be unprovided with valves and are to open a free communication between the chambers and are to be of such number and size as may be necessary to the production of the best effect.

Each one of the lateral chambers B, E, is to be provided with a plunger or horizontal block F, or F′, attached to a vertical bar or rod G or G′, both rods being respectively jointed to a brake H, and in such manner that when the brake is worked up and down a reciprocating vertical motion shall be imparted to each plunger, one of the said plungers being elevated while the other is being depressed. The brake is supported by standards I, K, in the upper parts of which there should be suitable bearings for supporting the journals of the rocker shaft L of the brake.

The middle compartment C, may be denominated the air chamber. During the operation of the churn, it being supposed to be provided with cream or milk to a proper depth, the cream or milk is alternately thrown back and forth in several streams through the air chamber it being raised in one of the lateral chambers while it is depressed in the other. The commotion produced in the air chamber by the streams so intermingles air with the lacteal matter as to very quickly oxygenate and cause a separation or production of butter. It is found by experiment that the peculiar reciprocating action of the two pistons or plungers is very favorable to the oxygenation of the liquid.

Through each of the partitions $a$, $b$, and near the upper part thereof, I make one or more holes $d, d, d$, &c., as seen in Figs. 2 and 3, they being so arranged that the plunger F or F′, during its upward stroke, shall pass partially or wholly above them, and in order to allow air to rush through said hole or holes and into the space directly under the plunger. The descent of the plunger forces such air into and through the cream and thus the oxygenation of it is very materially aided.

What I claim as my invention, is—

The combination of the external chambers their plungers and discharging passages, with the middle or air chamber; the whole being constructed applied and used substantially as specified, and, in combination with the above I claim the air entering passages $d, d$, &c., applied and used substantially in manner and for the purpose as above specified.

JOHN ANDREWS.

Witnesses:
 R. H. EDDY,
 CALEB EDDY.